(12) United States Patent
Stanek et al.

(10) Patent No.: US 10,065,765 B2
(45) Date of Patent: Sep. 4, 2018

(54) CONTAINMENT SYSTEMS AND METHODS OF MAKING AND USING SAME

(71) Applicant: ENPAC, L.L.C., Eastlake, OH (US)

(72) Inventors: Lawrence Stanek, Akron, OH (US); Scott Dragon, Jefferson, OH (US); Robert D. Heintz, Chardon, OH (US); Scott R. Janda, Chargrin Falls, OH (US); Timothy D. Reed, Northfield Center, OH (US); Jay Wiley, Mentor, OH (US)

(73) Assignee: ENPAC L.L.C., Eastlake, OH (US)

( * ) Notice: Subject to any disclaimer, the term of this patent is extended or adjusted under 35 U.S.C. 154(b) by 481 days.

(21) Appl. No.: 14/763,513

(22) PCT Filed: Jan. 22, 2014

(86) PCT No.: PCT/US2014/012607
§ 371 (c)(1),
(2) Date: Jul. 25, 2015

(87) PCT Pub. No.: WO2014/116746
PCT Pub. Date: Jul. 31, 2014

(65) Prior Publication Data
US 2015/0367988 A1 Dec. 24, 2015

Related U.S. Application Data

(60) Provisional application No. 61/756,810, filed on Jan. 25, 2013.

(51) Int. Cl.
*B65D 21/02* (2006.01)
*B65D 88/02* (2006.01)
(Continued)

(52) U.S. Cl.
CPC ........ *B65D 21/0233* (2013.01); *B29C 41/042* (2013.01); *B65D 21/0224* (2013.01);
(Continued)

(58) Field of Classification Search
CPC ................ B65D 21/0233; B65D 21/02; B65D 21/0224; B65D 19/00; B65D 90/24; B65D 88/027; Y10T 29/49616
(Continued)

(56) References Cited

U.S. PATENT DOCUMENTS 3,650,224 A * 3/1972 Petix .................. B65D 19/0075
108/54.1
5,020,667 A * 6/1991 Bush .................. B65D 19/0018
108/55.1
(Continued)

FOREIGN PATENT DOCUMENTS

GB    2317138 A *   3/1998    ............. B29C 41/04

*Primary Examiner* — Jason L Vaughan
*Assistant Examiner* — Amanda Meneghini
(74) *Attorney, Agent, or Firm* — Rankin, Hill & Clark LLP (57) ABSTRACT

A containment system includes a rotationally molded polymeric base unit in the form of a tub having an open top. The base unit includes a generally L-shaped rim at the open top comprised of an upwardly extending section that terminates in a cut edge and an inwardly extending section. The containment system also includes at least one perforated grate having a top side, a bottom side and a peripheral edge. The at least one perforated grate is supported, at least in part, by the inwardly extending section of the rim in such a manner that a container can be supported on the top side of the grate above the tub.

13 Claims, 10 Drawing Sheets

(51) Int. Cl.
*B29C 41/04* (2006.01)
*B65D 90/24* (2006.01)
*B29L 31/00* (2006.01)

(52) U.S. Cl.
CPC ........... *B65D 88/027* (2013.01); *B65D 90/24* (2013.01); *B29K 2023/06* (2013.01); *B29L 2031/7126* (2013.01); *Y10T 29/49828* (2015.01)

(58) Field of Classification Search
USPC .......... 29/527.1, 527.2, 527.3, 557; 206/515, 206/519, 520, 505
See application file for complete search history.

(56) References Cited

U.S. PATENT DOCUMENTS

| | | |
|---|---|---|
| 5,092,251 A | 3/1992 | Hamaker |
| 5,307,931 A | 5/1994 | Gillispie et al. |
| 6,349,656 B1 * | 2/2002 | Mitchell ............ B65D 19/0087 108/53.1 |
| 6,382,108 B1 | 5/2002 | Stanek |

* cited by examiner

CONTAINMENT SYSTEMS AND METHODS OF MAKING AND USING SAME

BACKGROUND OF INVENTION

Field of Invention

The present invention relates to containment systems for containers and a method of manufacturing a containment assembly.

Description of Related Art

40 C.F.R. § 264.175 specifies that container storage areas, unless subject to certain exceptions, must have a containment system that is designed and operated as follows:
(1) A base must underlie the containers which is free of cracks or gaps and is sufficiently impervious to contain leaks, spills, and accumulated precipitation until the collected material is detected and removed;
(2) The base must be sloped or the containment system must be otherwise designed and operated to drain and remove liquids resulting from leaks, spills, or precipitation, unless the containers are elevated or are otherwise protected from contact with accumulated liquids;
(3) The containment system must have sufficient capacity to contain 10% of the volume of containers or the volume of the largest container, whichever is greater;
(4) Run-on into the containment system must be prevented unless the collection system has sufficient excess capacity in addition to that required in paragraph (b)(3) of this section to contain any run-on which might enter the system; and
(5) Spilled or leaked waste and accumulated precipitation must be removed from the sump or collection area in as timely a manner as is necessary to prevent overflow of the collection system.

BRIEF SUMMARY OF THE INVENTION

The present invention is directed toward an improved containment system that complies with the requirements of 40 C.F.R. § 264.175 and a method of manufacturing a containment system.

According to one aspect of the invention, a containment system includes a rotationally molded polymeric base unit in the form of a tub having an open top. The base unit includes a generally L-shaped rim at the open top comprised of an upwardly extending section that terminates in a cut edge and an inwardly extending section. The containment system also includes at least one perforated grate having a top side, a bottom side and a peripheral edge. The at least one perforated grate is supported, at least in part, by the inwardly extending section of the rim in such a manner that a container can be supported on the top side of the grate above the tub.

According to another aspect of the invention, the present invention comprises a plurality of rotationally molded polymeric base units of a containment system in a nested stack. Each of the base units is in the form of a tub having a bottom portion and an open top and includes a generally L-shaped rim at the open top comprised of an upwardly extending section that terminates in a cut edge and an inwardly extending section.

According to another aspect of the invention, the present invention provides a method for manufacturing a pair of base units of a containment system, which includes simultaneously heating and rotating a rotational molding cavity containing polymeric resin to a temperature at which the polymeric resin forms a molten layer on an interior surface of the rotational molding cavity that defines the pair of base units that are formed together. Each of the base units is in the form of a tub and includes a generally L-shaped rim comprised of an upwardly extending section and an inwardly extending section. The method also includes cooling the rotational molding cavity to solidify the polymeric resin and removing a hollow solidified polymeric structure from the cooled rotational molding cavity. The method also includes cutting the hollow solidified polymeric structure such that the upwardly extending section of the rim of each of the pair of the base units terminates in a cut edge.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
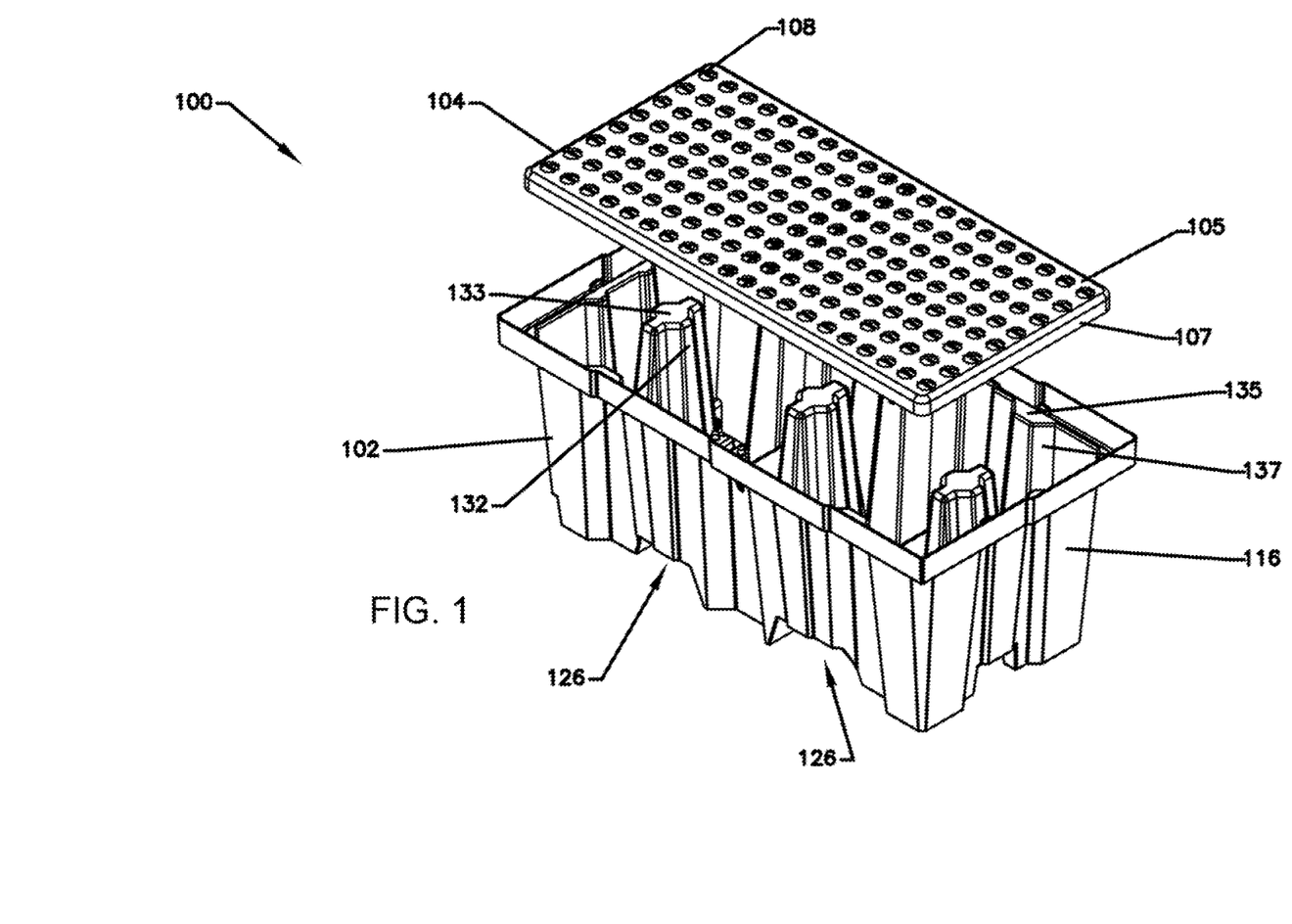
FIG. 1 is an exploded perspective view of a containment system according to the invention.

With reference to FIG. 1, a containment system 100 according to the invention comprises a base unit 102 and at least one perforated grate 104, which is supported by the base unit 102. The base unit 102 and the grate 104 may be formed of polyethylene, which provides excellent chemical resistance and mechanical properties. Alternatively, the base unit 102 and/or the grate 104 may be made of any material or combination of materials that provides sufficient chemical resistance and mechanical properties. The base unit 102 and the grate 104 may be from the same or different materials. The base unit 102 is preferably manufactured by rotational molding.

In a preferred embodiment the base unit 102 and the grate 104, when viewed from the top are generally rectangular in shape. The base unit 102 preferably is in the form of a tub with an open top. It is noted that the term base unit and tub are used interchangeably throughout the instant specification and are intended to be equivalent terms. It will be appreciated that other shapes for the base unit 102 and grate 104 are possible and contemplated (e.g., square, hexagonal etc.). It will also be appreciated that the base unit 102 and the grate 104 could have wall thicknesses that are greater or less than the illustrated embodiments without departing from the scope of the invention.

The grate 104 includes a top side 105 adapted to contact containers or drums that are placed on the grate 104. The grate 104 also includes a bottom side that is opposite the top side 105. Further, the grate 104 includes a peripheral edge 107 that extends around a perimeter of the grate 104. A plurality of perforations 108 are provided through the grate 104, which extend between the top side 105 and the bottom side to allow fluid to pass through the grate 104. Although the perforations 108 are shown as being circular in shape, it will be understood that the perforations 108 could be any number of shapes that permit the passage of fluid through the grate 104 into the base unit 102 (e.g., the perforations could be configured as slits or slots).

When the containment system 100 is to be used with a single 55-gallon drum, the top side 105 of the grate 104 can have an area sufficient to support one standard 55-gallon drum (and may define a generally square shape). And, when the containment system 100 is to be used with two 55-gallon drums, the top side 105 of the grate 104 preferably has an area sufficient to support two standard 55-gallon drums side-by-side above the base unit 102 (as illustrated). It will be appreciated that the containment system 100 can be scaled in size to allow any number of configurations to allow for sufficient drum storage.

Figure 2:
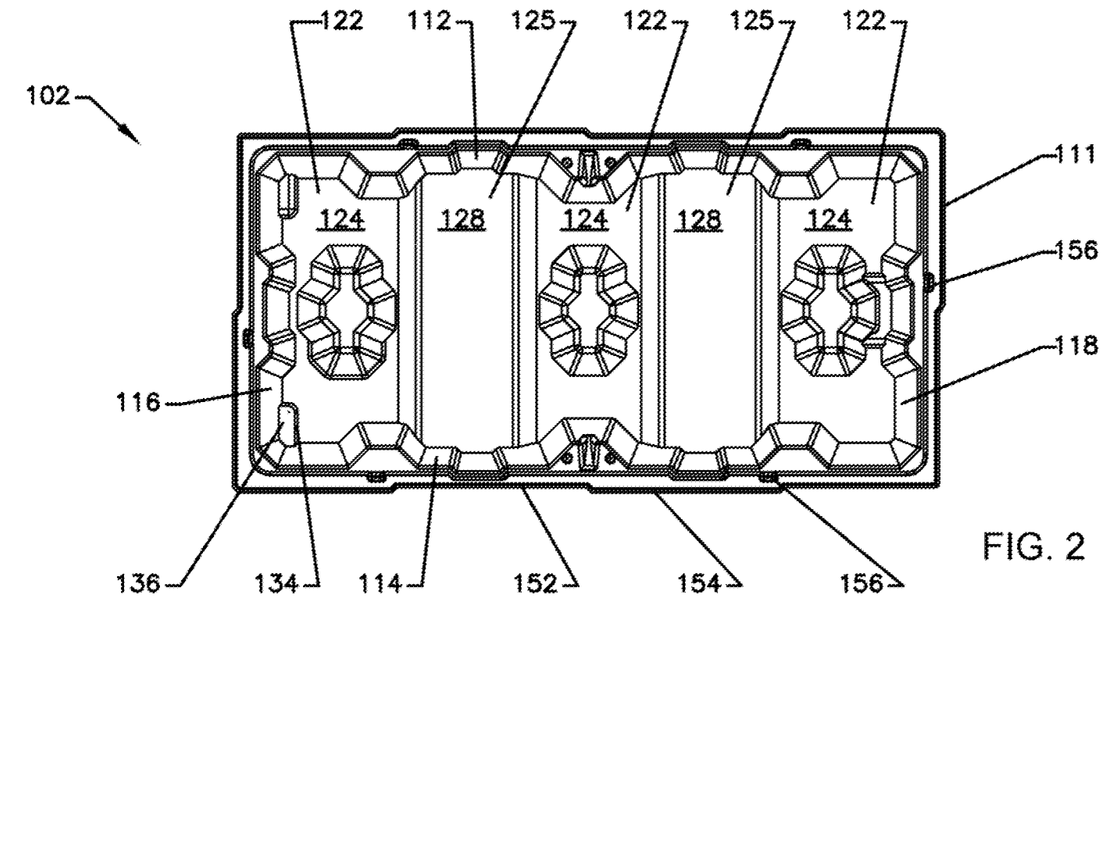
FIG. 2 is a top view of a base unit of the containment system shown in FIG. 1.

As shown in FIGS. 1-2, the base unit 102 includes a bottom portion 110 and first and second primary sidewalls 112, 114. The first and second primary sidewalls 112, 114 upwardly extend from the bottom portion 110 to a rim 111, which is shown in greater detail in FIG. 3. For reference, the first and second primary sidewalls 112, 114 may also be referred to as a first pair of sidewalls. The base unit 102 also includes first and second connecting sidewalls 116, 118 that also upwardly extend from the bottom portion 110 to the rim 111. The first and second connecting sidewalls 116, 118 may also be referred to as a second pair of sidewalls.

As such, the bottom portion 110 cooperates with the two pairs of opposing sidewalls 112, 114, 116, 118 to form a tub for collecting and containing fluids that may pass through the perforations 108 in the grate 104. The base unit 102, when sized for use with a single 55-gallon drum, may have a capacity to hold 66 gallons or more of liquid (thereby complying with provisions set forth in Uniform Fire Code §§ 79.405 and 79.406), which is greater than 110% of the volume capacity of a typical 55-gallon drum. Alternatively, when the base unit 102 is sized for use with two 55-gallon drums, the base unit 102 may have a minimum capacity of 122 gallons.

The bottom portion 110 and the grate 104 are vertically spaced from one another when in an assembled state. This spacing provides the aforementioned capacity to hold fluids that pass through the grate 104. The bottom portion 110 includes foundation portions 122 with foundation upper surfaces 124 that face the grate 104. Further, the bottom portion 110 includes two parallel elevated sections 125 that cooperate to define a pair of channels 126 that are separated by the foundation portions 122. The elevated sections 125 each include a channel upper surface 128 that faces the grate 104. As shown, the foundation portion 122 lies on both sides of the channels 126. The channel upper surfaces 128 are disposed so as to be vertically offset from the grate 104 a distance that is less than a vertical distance between the foundation upper surface 124 and the grate 104. Stated simply, the channel upper surfaces 128 are closer to the grate 104 than the foundation upper surface 124 of the foundation portion 122 is to the grate 104. Because of this, a plurality of base units may be stacked within one another, or nested, as will be described hereinafter.

The channels 126 laterally extend between the first and second primary sidewalls 112, 114 and are spaced from one another to receive forks of a fork lift or tow motor. Thus, the bottom portion 110 of the base unit 102 can be configured such that the fork lift or tow motor can be used to lift the containment system 100. This allows for improved transportability and easier deployment of the containment system 100 or a plurality of base units 102, alone or when in a nested arrangement.

Preferably, at least one support pillar 132 with a top 133 is disposed on the bottom portion 110. As illustrated, three support pillars 132 are disposed on the bottom portion 110. However, it will be appreciated that more or less support pillars 132 could be used without departing from the scope of the invention. As shown, the support pillars 132 upwardly extend from the foundation portion 122 of the bottom portion 110 so as to bridge the distance between the grate 104 and the bottom portion 110. Specifically, the top 133 of the support pillar 132 contacts the bottom side of the grate 104. The support pillar 132 provides additional strength to the containment system 100 by supporting the grate 104. The support pillar 132 is preferably integrally formed with the bottom portion 110, but may be a separate component. Further, the support pillar 132 may be of a hollow-type construction with fluting. This type of construction helps to reduce the overall weight of the containment system 100 and permits nesting of multiple base units 102 as will be described hereinafter. Preferably, a plurality of support columns 137 having a top surface 135 are also formed on the sidewalls, 112, 114, 116, 118.

The first and second primary sidewalls 112, 114 and the first and second connecting sidewalls 116, 118 upwardly extend from the bottom portion 110 in a slightly outward manner so as to reduce the footprint of the base unit 102 while still allowing for sufficient fluid storage capacity. In particular, a distance between the first and second primary sidewalls 112, 114 near the bottom portion 110 is preferably less than the distance between the first and second primary sidewalls 112, 114 near the grate 104. Further, a distance between the first and second connecting sidewalls 116, 118 near the bottom portion 110 is preferably less than the distance between the first and second connecting sidewalls 116, 118 near the grate 104. This outwardly extending manner of the first and second primary sidewalls 112, 114 and the first and second connecting sidewalls 116, 118 also allows for improved nesting of multiple base units. The first and second primary sidewalls 112, 114 and the first and second connecting sidewalls 116, 118 of the base unit 102 are also preferably fluted. Like the fluting of the support pillar 132, strength of the base unit 102 is increased and nesting of multiple base units is improved. In particular, when multiple base units have fluting, the possibility of wedging or sticking together of the base units is reduced.

Figure 3:
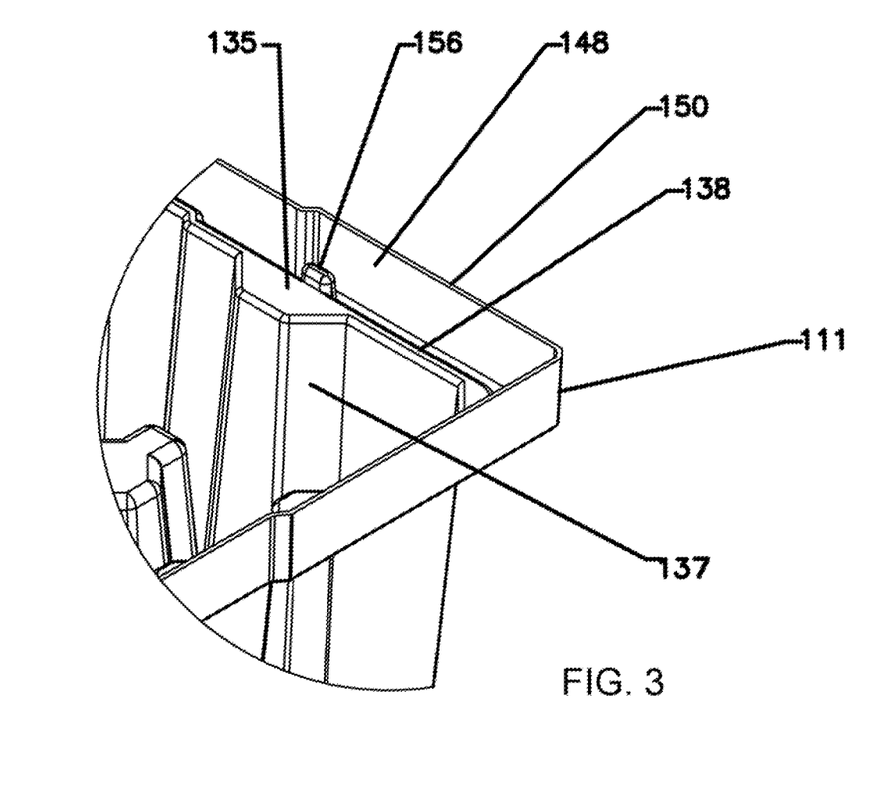
FIG. 3 is an enlarged perspective view of a rim portion of a base unit of the containment system shown in FIG. 1.

With reference to FIGS. 2-3, the containment system 100 can also include at least one upwardly and inwardly extending nesting limiter 134, and more preferably two nesting limiters 134 each disposed on one side of the base unit 102. The nesting limiters 134 includes support surfaces 136 that face the grate 104. As illustrated, the nesting limiter 134 can have a rectangular shape in plan and elevation view and contacts the bottom portion 110. Alternatively, nesting limiter 134 can be vertically spaced from the bottom portion 110. The support surface 136 is vertically spaced from the grate 104 a vertical distance that less than a vertical distance between the foundation upper surface 124 and the grate 104 and more than a vertical distance between the channel upper surface 128 and the grate 104. Further, the support surface 136 is spaced from the grate 104 a vertical distance that less than a vertical distance between the bottom portion 110 and the grate 104 and more than a vertical distance between the top 133 of the support pillar 132 and the grate 104. This type of layout further helps to minimize wedging of nested base units.

Further, the nesting limiter 134 can be disposed on the first connecting sidewall 116 at a location adjacent the first primary sidewall 112. The nesting limiter 134 allows for further connection between the first connecting sidewall 116 and the first primary sidewall 112 to improve strength and rigidity of the base unit 102. As illustrated, the nesting limiter 134 is integral with the first connecting sidewall 116. However, it will be understood that the nesting limiter 134 could be a separate component and merely installed on the first connecting sidewall 116.

The layout of the nesting limiter 134, and particularly the support surface 136, provides numerous advantages. For example, when the base units 102 are nested within one another, the nesting limiter 134 prevents multiple base units from becoming wedged together. Specifically, the support surface 136 of a first base unit contacts a surface of the bottom portion 110 that is opposite the foundation surface of a second base unit to prevent over-insertion of the second base unit into the first base unit. This spacing provides for easy removal of the second base unit from the first base unit. Further, the nesting limiter 134 provides added rigidity by connecting the first connecting sidewall 116 and the first primary sidewall 112 together, and optionally, connecting the first connecting sidewall 116 and the second primary sidewall together, thereby further improving rigidity of the base unit 102.

As noted above, and with particular reference to FIG. 3, the containment system 100 also includes the rim 111. The rim 111 is generally L-shaped in a vertical cross-section plane and includes an inwardly extending section 138 that inwardly extends from the sidewalls 112, 114, 116, 118 and an upwardly extending section 148 that terminates into a cut edge 150. The cut edge 150 is present because of the manner in which the base unit 102 is manufactured. Specifically, a hollow solidified polymeric structure is manufactured by rotational molding and then the hollow polymeric structure is cut into two base units along the area of the cut edge 150 (a band of material can be removed between the two base units formed in this manner, leaving a cut edge on each base unit). For reference, this process will be discussed in more detail hereinafter during the explanation of the method of manufacturing a pair of base units.

As shown, the inwardly extending section 138 is vertically spaced from the bottom portion 110 and supports the grate 104. The inwardly extending section 138 can optionally cooperate with the support columns 137 to support the grate 104 and any objects placed on top of the grate 104. The inwardly extending section 138 and the top surface 135 of the support columns both face in a same direction, which is toward the grate 104, to provide a sufficient support surface for engagement with the grate 104.

As shown in FIGS. 1 and 3, the upwardly extending section 148 upwardly extends in a direction away from the bottom portion 110. In one preferred embodiment, the upwardly extending section 148 can upwardly extend about 4", which allows twenty-four base units to be nested in a height of less than ten feet. Thus, the upwardly extending section 148 helps to reduce lateral and longitudinal movement of the grate 104, thereby ensuring overall stability of the containment system 100. The upwardly extending section 148 and the inwardly extending section 138 cooperate to define the rim 111 of the containment system 100 at the open top. Thus, the grate 104 is disposed within the peripheral opening defined by the L-shaped rim 111 of the base unit 102.

In the illustrated embodiment, the rim 111 defines a quadrangle having adjacent sides that are arranged 90° relative to each other. Further, the upwardly extending section 148 on each side of the quadrangle is non-planar. Additionally, the upwardly extending section 148 includes at least one recessed area 152 and at least one non-recessed area 154. The recessed area 152 of one base unit is configured to interact with the non-recessed area 154 of another base unit as will be described hereinafter. The recessed area 152 is disposed laterally inward from the non-recessed area 154.

As shown in FIG. 2, the inwardly extending section 138 can include a plurality of stays 156. The upwardly extending stays 156 contact the grate 104. Specifically, the bottom side 106 of the grate 104 that is proximal to the peripheral edge 107 makes contact with the inwardly extending section 138 of the rim 111 between the plurality of upwardly projecting stays 156 and the upwardly extending section 148 of the rim 111. Thus, the sidewalls 112, 114, 116, 118 are connected to one another or tied together with the grate 104 so as to prevent excess outward deflection of the sidewalls.

Figure 4:
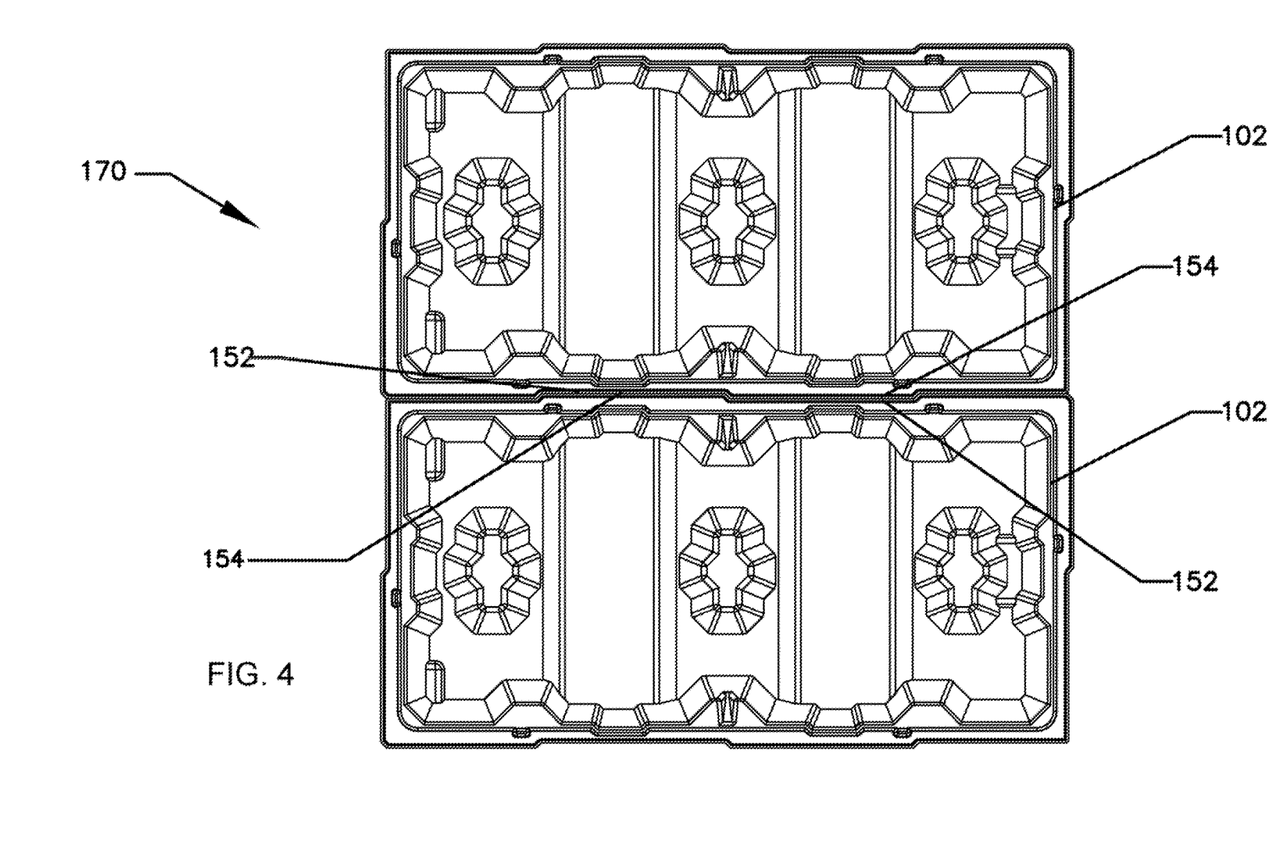
FIG. 4 is a top view of two base units of the containment system shown in FIG. 1 in a side-by-side arrangement.
Figure 5:
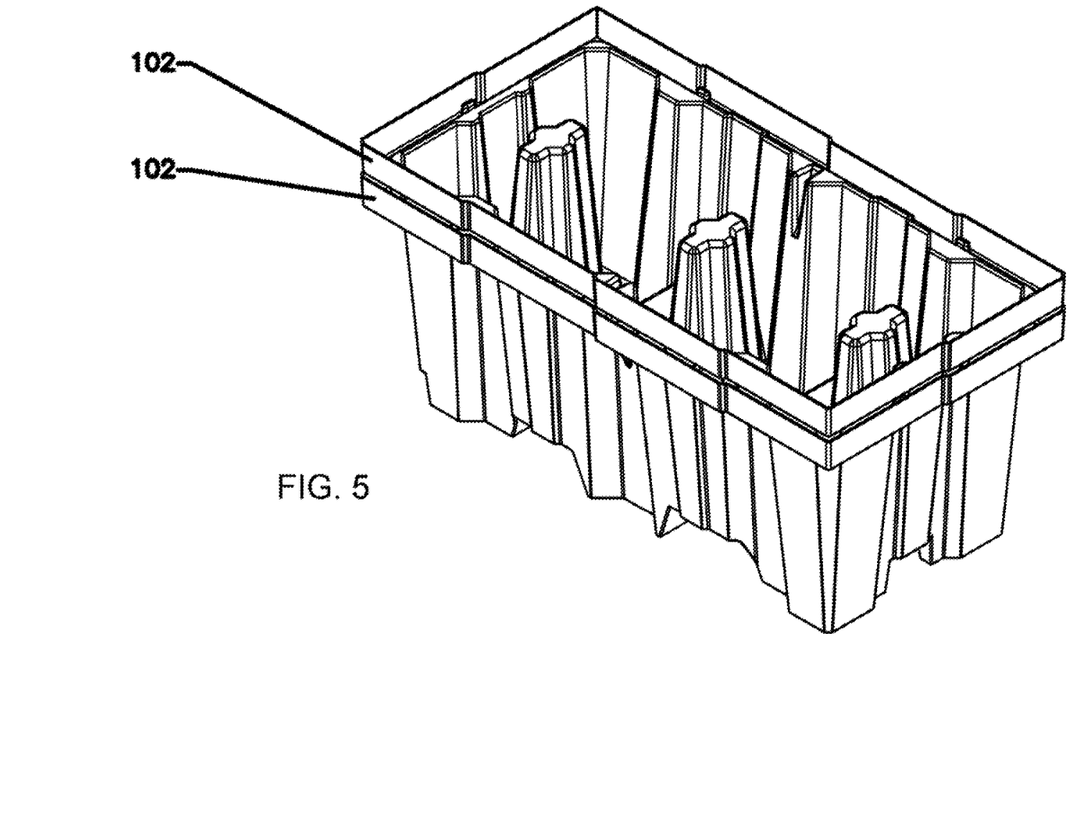
FIG. 5 is a perspective view showing two base units of the containment system shown in FIG. 1 nested together.

With reference to FIG. 4, a containment storage area 170 comprising two base units 102 of the containment system shown in FIG. 1 in a side-by-side arrangement. It will be appreciated that in use, a grate 104 would be placed on each of the two base units 102 to establish a common, horizontal surface for supporting containers. The recessed areas 152 and non-recessed areas 154 on the respective rims 111 of the two base units are cooperatively shaped to engage and interlock together. This improves the strength of the containment storage area 170, and also reduces the likelihood that fluid could escape between the base units. It will be appreciated that the recessed areas 152 and non-recessed areas 154 also align on an end-to-end basis and end-to-side basis, which allows for the engagement of more than two base units 102 in various configurations.

Multiple base units 102 can be nested together to reduce the amount of space required during storage and transport. For ease of illustration, FIGS. 5-8 show various views of two base units 102 in a nested configuration. It will be appreciated that substantially larger numbers (e.g., >10) of base units can be nested together for storage or transport, as desired.

Figure 6:
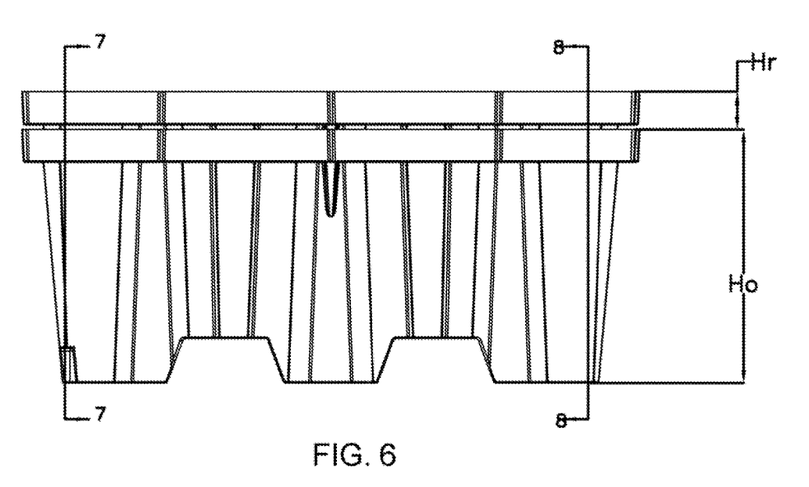
FIG. 6 is a side view of the two nested base units shown in FIG. 5.
Figure 7:
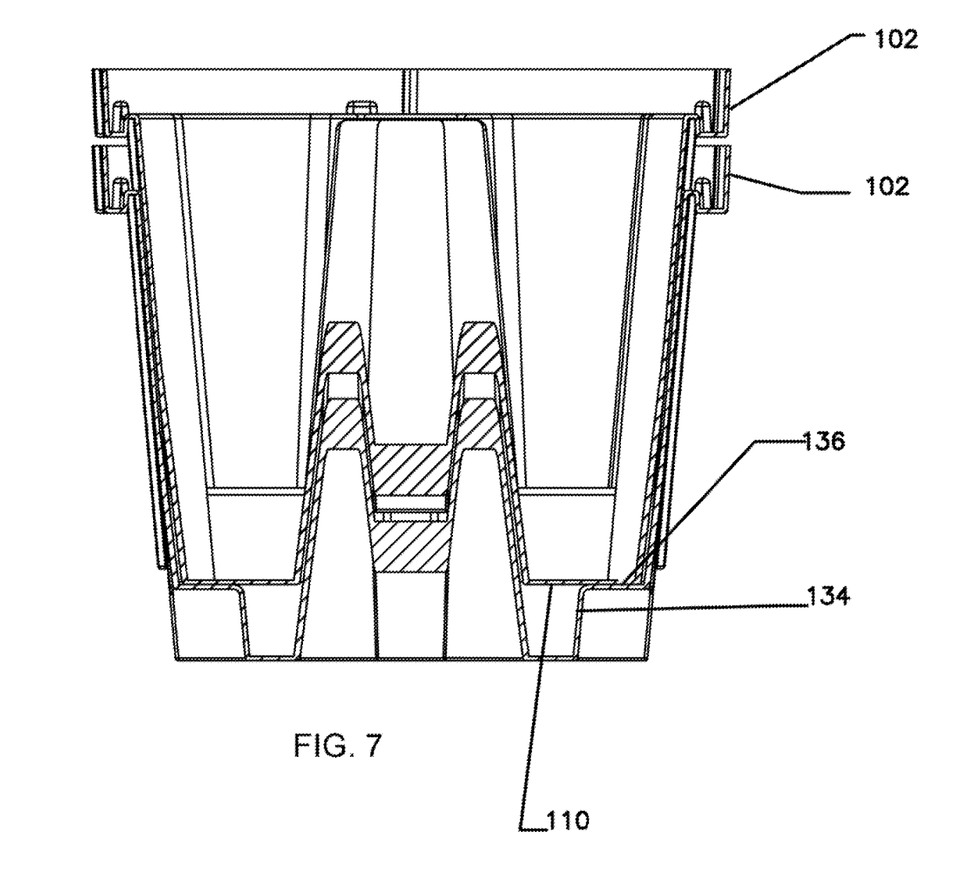
FIG. 7 is a sectional view along the line 7-7 of FIG. 6.
Figure 8:
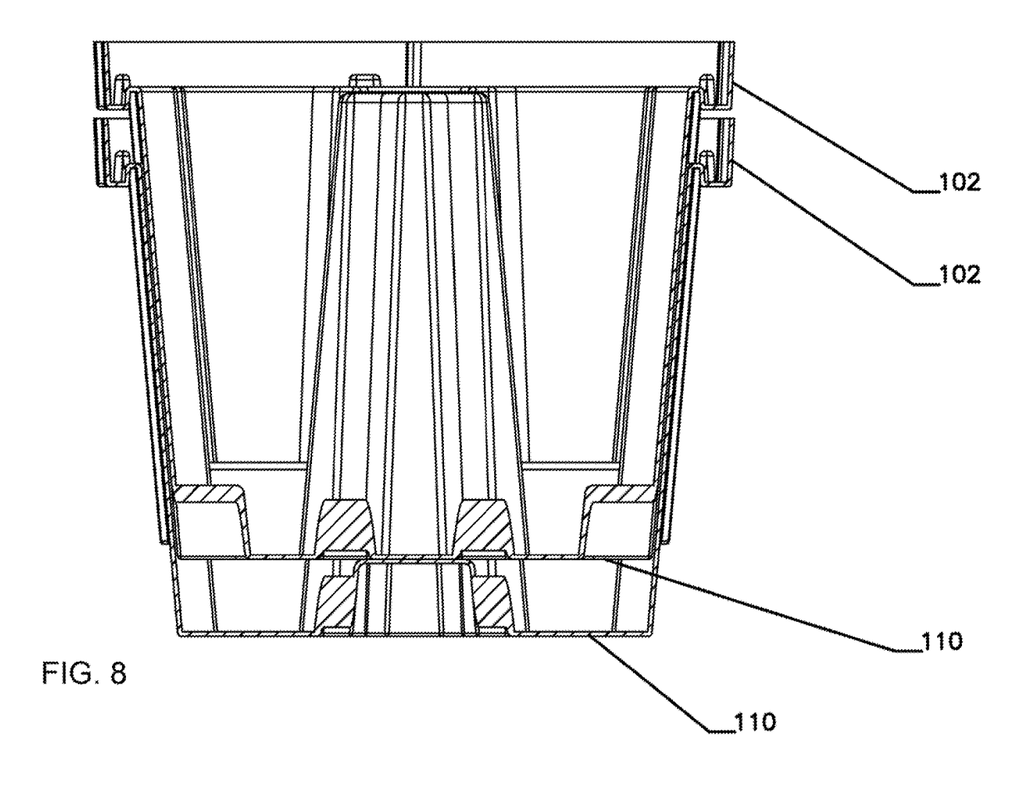
FIG. 8 is a sectional view along the line 8-8 of FIG. 6.

As best shown in FIG. 6, each base unit 102 has an overall height $H_O$ measured from the side of the bottom portion 110 opposite the foundation upper surface 124 (i.e., the part of the base unit 102 that would contact the ground) to the cut edge 150. Preferably, the outer side of the rim 111 has a height $H_R$ that is within the range of from about 10% to about 20%, more preferably from about 12.5% to about 17.5%, and most preferably about 15% of the overall height $H_O$. As shown in FIGS. 7-8, the nested base units are 180° out of phase with one another, meaning that the nesting limiters 134 on one end of a lower base unit make contact with the bottom 110 of the next succeeding base unit nested therein. This 180°-out-of-phase stacking continues with each successively nested base unit to prevent the base units from becoming wedged together (which makes removal difficult).

The novel design of the base units of the containment systems according to the present invention allows for a large number to be stored and transported in a compact area, which is a substantial improvement over current products.

For example, only approximately 152 two-drum containment systems presently sold by the assignee of the present application under product numbers 5253-YE and 5260-YE can be shipped in a standard 40' high cube container. However, approximately 440 two-drum containment systems according to the present invention can be shipped or stored in the same 40' high cube container. Obviously, similar improvements in packing density are obtained for 53' high cube containers (194 versus 616). The improvement in packing density achieved by the invention reduces the amount of energy required to transport a containment system.

Figure 9:
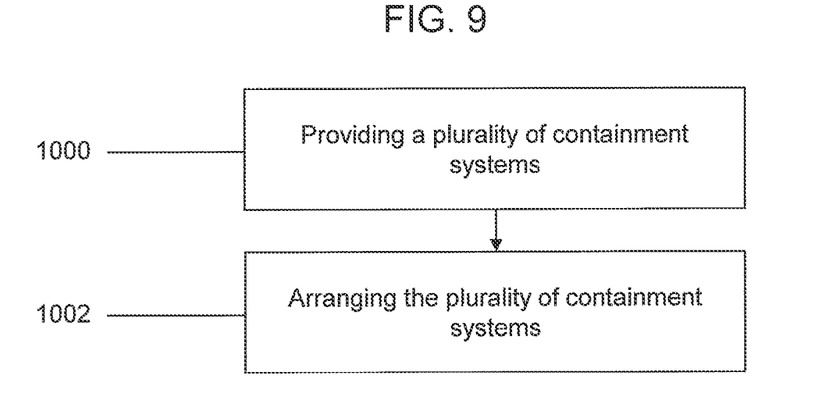
FIG. 9 is a flowchart of a method of arranging a containment assembly.

With reference to FIG. 9, a method for setting up a container storage area is illustrated. In Step 1000, a plurality of containment systems are provided. Each of the containment systems includes a rotationally molded polymeric base unit that is in the form of a tub having an open top. The base unit includes a generally L-shaped rim at the open top comprised of an upwardly extending section that terminates in a cut edge and an inwardly extending section. The rim of the base unit generally defines a quadrangle having adjacent sides that are arranged 90° relative to each other. The upwardly extending section of the rim on each side of the quadrangle is non-planar and includes at least one recessed area. Each of the containment systems also includes at least one perforated grate having a top side, a bottom side and a peripheral edge. The at least one perforated grate is supported, at least in part, by the inwardly extending section of the rim in such a manner that a container can be supported on the top side of the grate above the tub. In Step 1002, the plurality of containment systems are arranged side by side such that the recessed area of one of the plurality of containment systems receives a non-recessed area of another of the plurality of containment systems and the side-by-side containment systems thereby become interlocked. Further, the plurality of containment systems can be arranged so that the grates of the plurality of containments systems cooperate to define a common horizontal plane.

Thus, a plurality of base units can be nested together during shipment and storage, allowing for substantial space savings and reduced energy costs during shipping. Specifically, more base units can be shipped in the same space, reducing the number of shipments necessary to transport an equivalent number of containment systems. This is possible because each successive base unit in the stack of nested base units is rotated 180° (end to end) relative to the base unit within which it is nested, which makes it nearly impossible to "wedge" the units together under load. This also makes it easier to remove each unit from the stack.

Alternatively, a plurality of base units can be provided to an end user in a first configuration in which the plurality of base units are in a stack and are nested together. The end user separates one or more individual base units from the stack and places one or more grates onto the base units to form a containment system. If desired, two or more containment systems can be positioned with the bottom of the base unit resting on a floor or other generally horizontal surface such that the two or more containment systems become linked via upwardly extending side portions of the L-shaped rim of the base units, which include sections that are disposed outwardly and contiguous sections that are disposed inwardly on each side of the base unit. The containment systems can thus be used to support drums or other containers containing liquids or other materials.

Figure 10:
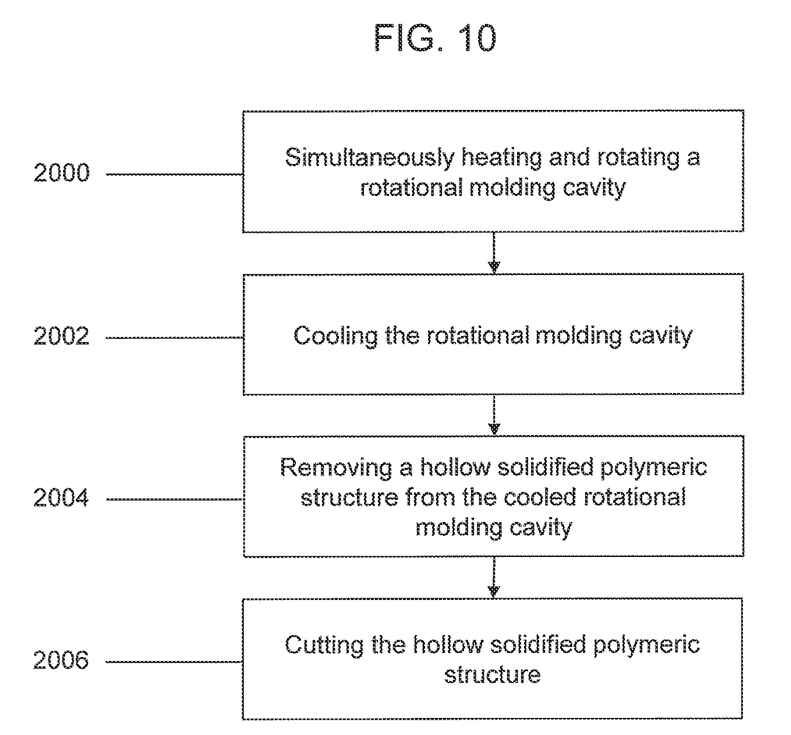
FIG. 10 is a flowchart of a method for manufacturing a pair of base units of a containment system.

With reference to FIG. 10, a method for manufacturing a pair of base units of a containment system is shown. In Step 2000, a rotational molding cavity containing polymeric resin is simultaneously heated and rotated. Specifically, the cavity is heated to a temperature at which the polymeric resin forms a molten layer on an interior surface of the rotational molding cavity that defines the pair of base units. Each of the base units is in the form of a tub and includes a generally L-shaped rim. The rim includes an upwardly extending section and an inwardly extending section. In Step 2002, the rotational molding cavity is cooled to solidify the polymeric resin. In Step 2004, a hollow solidified polymeric structure is removed from the cooled rotational molding cavity. In Step 2006, the hollow solidified polymeric structure is cut such that the upwardly extending section of the rim of each of the pair of base units terminates in a cut edge.

This method offers numerous advantages. For example, multiple base units can be manufactured at once. Thus, production output is increased as compared to a method in which only one base unit is manufactured at a time. Further, only one set of production equipment is required instead of two sets of production equipment for equivalent throughput. Further still, the amount of polymer waste is reduced as the cut edge is shared between two base units.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A containment system comprising:
a rotationally molded polymeric first base unit in a form of a tub having a bottom configured to rest on a floor, an inner bottom portion and an open top, said first base unit including a generally L-shaped rim at the open top comprised of an upwardly extending section that terminates in a cut edge and an inwardly extending section; and
at least one perforated grate having a top side, a bottom side and a peripheral edge, said at least one perforated grate being configured for placement on the first base unit such that the bottom side of said at least one perforated grate is supported, at least in part, by the inwardly extending section of the rim with the bottom side of the grate spaced apart from the inner bottom portion of the tub and the top side arranged to support at least one container above the inner bottom portion of the tub;
wherein the tub comprises two pairs of opposing sidewalls, which extend from the inner bottom portion of the tub to the rim,
wherein at least one inwardly extending nesting limiter is formed in at least one of the sidewalls of the tub,
wherein the at least one nesting limiter includes a support surface that, when the at least one grate is placed on the first base unit, is closer to the bottom side of the grate than the inner bottom portion of the tub, faces the at least one grate and is spaced from the at least one grate, and
wherein the nesting limiter is configured such that, when a second base unit that is identical to the first base unit is nested 180° out-of-phase within the tub of the first base unit, said nesting limiter of the first base unit limits insertion of the second base unit into the first base unit based on contact between said support surface of said nesting limiter of the first base unit and the bottom of the second base unit.

2. The containment system according to claim 1, wherein a plurality of upwardly extending stays are provided in the inwardly extending section of the rim, and wherein the bottom side of the perforated grate proximal to the peripheral edge makes contact with the inwardly extending section of the rim between the plurality of upwardly extending stays and the upwardly extending section of the rim.

3. The containment system according to claim 1, wherein the rim of the base unit generally defines a quadrangle having adjacent sides that are arranged 90° relative to each other.

4. The containment system according to claim 3, wherein the upwardly extending section of the rim on each side of the quadrangle is non-planar and includes at least one recessed area.

5. The containment system of claim 4, wherein the rim further includes at least one non-recessed area, and wherein the recessed area and the non-recessed area are disposed on opposite sides of the quadrangle.

6. A method for setting up a container storage area, the method comprising:
  providing a plurality of containment systems according to claim 4;
  arranging the plurality of containment systems side by side such that the recessed area of one of the plurality of containment systems receives a non-recessed area of another of the plurality of containment systems and the side-by-side containment systems thereby become interlocked.

7. The method for setting up a container storage area of claim 6, wherein the plurality of containment systems are arranged so that the grates of the plurality of containments systems cooperate to define a common horizontal plane.

8. The containment system according to claim 1, wherein the first base unit includes at least one support pillar extending upwardly from the inner bottom portion of the tub, said support pillar including a top that makes contact with the bottom side of the at least one perforated grate.

9. The containment system according to claim 8, wherein the inner bottom portion of the tub includes two parallel elevated sections that cooperate to define a pair of channels under the tub for receiving lifting forks.

10. The containment system according to claim 8, wherein the at least one support pillar is fluted.

11. The containment system according to claim 1, wherein the two pairs of opposing sidewalls are fluted.

12. The containment system according to claim 1, wherein the tub has a volume capacity of at least 121 gallons and the top side of the at least one grate has an area sufficient to support two standard 55-gallon drums placed side-by-side above the tub.

13. A method for manufacturing a first base unit and a second base unit of a containment system, the method comprising:
  simultaneously heating and rotating a rotational molding cavity containing polymeric resin to a temperature at which said polymeric resin forms a molten layer on an interior surface of the rotational molding cavity, wherein the interior surface of the rotational molding cavity defines the first base and the second base unit, wherein the first base is identical to the second base unit, wherein both the first base unit and the second base unit are in a form of a tub having a bottom for resting on a floor, an inner bottom portion and a generally L-shaped rim comprised of an upwardly extending section and an inwardly extending section;
  cooling the rotational molding cavity to solidify the polymeric resin to form a hollow solidified polymeric structure;
  removing the hollow solidified polymeric structure from the cooled rotational molding cavity; and
  cutting the hollow solidified polymeric structure such that the upwardly extending section of the rim of each of the first base unit and the second base unit terminates in a cut edge;
  wherein the tub of each of first base unit and the second base unit comprises two pairs of opposing sidewalls, which extend from the inner bottom portion of the tub to the rim,
  wherein at least one inwardly extending nesting limiter is formed in at least one of the sidewalls of the tub of each of the first base unit and the second base unit,
  wherein each nesting limiter includes a support surface, and
  wherein the support surface of the nesting limiter of the first base unit limits insertion of the second base unit into the first base unit based on contact between said support surface of said nesting limiter of the first base unit and the bottom of the second base unit when the second base unit is nested 180° out-of-phase within the tub of the first base unit.

* * * * *